FRANCIS DEGEN & EDWIN R. PARSIL.
Improvement in Covers for Cones of Hat-body Formers.
No. 118,213.   Patented Aug. 22, 1871.

UNITED STATES PATENT OFFICE.

FRANCIS DEGEN AND EDWIN R. PARSIL, OF NEWARK, NEW JERSEY.

IMPROVEMENT IN COVERS FOR CONES OF HAT-BODY FORMERS.

Specification forming part of Letters Patent No. 118,213, dated August 22, 1871.

*To all whom it may concern:*

Be it known that we, FRANCIS DEGEN and EDWIN R. PARSIL, both of Newark, in the county of Essex and State of New Jersey, have invented a new and useful Improvement in Covers for Cones of Hat-Body Formers; and we do hereby declare the following to be a full, clear, and exact description thereof, which will enable those skilled in the art to make and use the same, reference being had to the accompanying drawing forming part of this specification, in which drawing—

Figure 1:
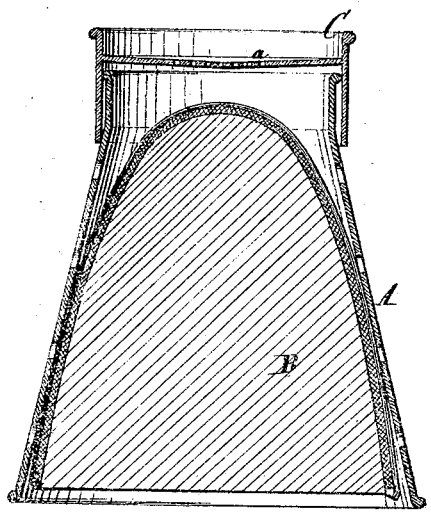
Figure 2:
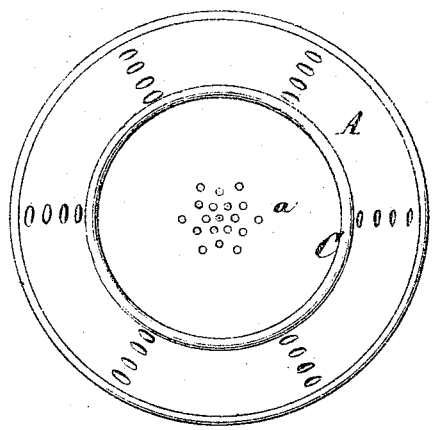

Figure 1 represents a vertical central section of this invention. Fig. 2 is a plan or top view of the same.

Similar letters indicate corresponding parts.

This invention relates to the arrangement of a sieve in the top of the cone-cover of a machine for forming hat-bodies in such a manner that the water poured on the top of the cone is evenly distributed and the fur covering the tip of the cone is not displaced; also, in the arrangement of a cup with a perforated bottom on the top of the cone-cover of a machine for forming hat-bodies in such a manner that when the cover, together with the cone, is immersed into water and then raised, the cup takes up a sufficient quantity of water to moisten the fur covering the tip of the cone, and the tedious operation of pouring water on said cone by means of ladles can be dispensed with.

In the drawing, A designates the cover for the cone B of a machine for forming hat-bodies. Usually this cover is open on top, and, after the fur for forming a hat-body has been blown on the cone a cloth is wrapped around said cone; then the cover is put on, and the whole is immersed in water for the purpose of moistening the body. In carrying out this operation the fur on the tip of the cone does not become sufficiently moistened, and, after the cone has been raised partly out of the water, the tip of the cone is moistened by pouring water over it with ladles. This operation, however, must be carried out with great care, since, if the water is poured on quick, the fur becomes displaced and the crown of the hat becomes defective. To avoid this difficulty we have provided the top of the cover A with a sieve, *a*, so that when the water is poured on said top it becomes evenly distributed before it strikes the fur on the tip of the cone and said fur is not liable to become displaced. With said sieve we have combined a raised rim, forming a cup, C, so that when the cone, together with its cover, is immersed in water and then slowly raised therefrom, a certain quantity of water will be taken up by the cup, and this water trickles slowly down over the tip of the cone while the latter is being slowly raised out of the water.

By this arrangement the operation of ladling is entirely dispensed with, much time is saved, and the fur covering the tip of the cone becomes uniformly moistened without the least danger of getting displaced.

What we claim as new, and desire to secure by Letters Patent, is—

1. The arrangement of a sieve, *a*, on the top of the cone-cover A, substantially as described.

2. The arrangement of a cup, C, with a perforated bottom, *a*, on the top of the cone-cover A, substantially as set forth.

FRANCIS DEGEN.
EDWIN R. PARSIL.

Witnesses:
   WM. BRADSHAW,
   JOSEPH SLATER, Jr.